Patented Jan. 23, 1934

1,944,250

UNITED STATES PATENT OFFICE 1,944,250

PREPARATION OF SULPHUR DYES

Herbert A. Lubs and George C. Strouse, Wilmington, Del., assignors to E. I. du Pont de Nemours & Company, Wilmington, Del., a corporation of Delaware No Drawing. Application September 5, 1930
Serial No. 479,932

13 Claims. (Cl. 260—17)

This invention relates to sulphur dyes and more particularly to the processes of thionation used in their manufacture.

Sulphur colors of bordeaux, green, and blue shades are usually manufactured by the thionation of various organic bodies by heating with sodium polysulphide in aqueous or alcoholic solution. Such thionations usually require from 20 to 150 hours and often leave much to be desired in brightness and yield.

It is an object of this invention to reduce the time required for the preparation of sulphur colors, to improve the quality and yield of sulphur colors and to devise new thionation processes. Other objects will appear hereinafter.

These objects are accomplished by the present invention whereby it has been discovered that many organic bodies can be thionated by heating with a solution of sodium polysulphide in the various ethers of ethylene glycol or diethylene glycol.

The invention will be readily understood from a consideration of the following examples in which the parts are given by weight.

Example I

Three (3) parts of sodium sulphide crystals were heated with 0.8 parts of sulphur until the boiling point of the solution was 170° C. Four and six tenths (4.6) parts of the mono-ethyl-ether of ethylene glycol were added and this addition followed by an additional 1.6 parts of sulphur. Then one part of the indophenol made by the condensation of nitroso-phenol with di-phenylamine was added. The mixture was then heated to boiling for about two hours in a suitable vessel equipped with a reflux condenser.

The mass was diluted with water, sufficient sodium sulphite added to dispose of the excess sulphur, and the dyestuff precipitated by means of sodium bisulphite (air precipitation in a similar process has been found satisfactory) and filtered off. There was obtained a dyestuff of a very greenish shade of blue. To produce a similar result by an alcoholic thionation requires about 140 hours of heating.

Example II

Para-hydroxy-phenyl-b-naphthylamine thionated for 6 hours and treated as described in Example I gave a black dye of excellent brightness and reddish shade.

Example III

The indophenol made by the joint oxidation of p-amino phenol and phenyl-a-naphthylamine-8-sulphonic acid (its leuco form has been used successfully) yielded, when thionated as described in Example I with the addition of a small amount of a copper salt, a green dye of unusual brightness.

Example IV

The compound 3-hydroxy-7-methyl-6-amino-phenazine upon thionation as described in Example I gave a sulphur color of bordeaux shade. In this case, however, the thionation was complete in about one hour. To produce a similar effect by the thionation with aqueous polysulphide from 20 to 40 hours would be required.

Example V

When the indophenol (its reduced form has also been used successfully) derived from the condensation of ethyl carbazole with nitroso-phenol, was thionated as described in Example I, a vat dyestuff is obtained which is similar in properties to, but greener and brighter in shade than Hydron blue G (C. I. 971).

Ordinarily such Hydron blue G is made by thionation of the same materials in alcoholic polysulphide and requires about 150 hours for completion.

Example VI

Six (6) parts of sodium sulphide crystals were heated with 1.6 parts of sulphur until the boiling point of the solution was 170° C. Four and six tenths (4.6) parts of the mono-methyl-ether of ethylene glycol were added and this addition followed by an additional 3.2 parts of sulphur. Then one part of 3-hydroxy-6-amino-7-methyl phenazine was added and the mixture heated to boiling for about 85 minutes in a suitable vessel equipped with a reflux condenser. The mass was then diluted with water and the dyestuff precipitated by air. The dyestuff thus obtained had a bright, bordeaux shade. To produce a similar effect by thionation with aqueous polysulphide would require from 20 to 40 hours.

Example VII

A mixture of 1.66 parts of sodium sulphide (60% flakes) 2.4 parts of sulphur, 4.6 parts of the mono-butyl-ether of ethylene glycol, and one part of the leuco indophenol, obtained by reducing the condensation product of ethyl-carbazole and nitroso-phenol, was heated to boiling for about three hours in a suitable vessel equipped with a reflux condenser. The mass was then diluted with water and the dyestuff precipitated by hydrochloric acid. The dyestuff thus obtained was similar to Hydron blue G. To produce a similar effect by thionation in alcoholic polysulphide would require about 150 hours.

Example VIII

Three (3) parts of sodium sulphide crystals were heated with 0.8 parts of sulphur until the boiling point of the solution was 120° C. Four and six tenths (4.6) parts of the mono-ethyl-ether of di-ethylene glycol are added and followed by an additional 1.6 parts of sulphur. Five tenths (0.5) parts of copper sulphate crystals were then added. Then one part of the leuco indophenol obtained by reducing the condensation product of phenyl-a-naphthylamine and nitroso-phenol was added. The mixture was then heated to boiling for about three hours in a vessel equipped with a reflux condenser. Afterwards the mass was diluted with water, sufficient sodium sulphite added to remove excess sulphur, and the dyestuff precipitated by air. The dyestuff thus obtained was a yellowish shade of green. To produce a similar result by an alcoholic polysulphide thionation would require about 70 hours.

Example IX

A mixture of 3.32 parts of sodium sulphide (60% flakes), 4.8 parts of sulphur, 0.5 parts of water, 4.6 parts of the mono-butyl ether of di-ethylene glycol, and one part of 3-hydroxy-6-amino-7-methyl phenazine was heated to boiling for about 70 minutes in a vessel equipped with a reflux condenser. The mass was then diluted with water and the dyestuff precipitated by aeration and filtered off. A dyestuff of bordeaux shade was obtained.

Particularly good results have been obtained with the mono-ethyl-ether of ethylene glycol with a wide range of intermediates and thionation conditions.

The temperature of the thionation is ordinarily regulated by the boiling point of the solvent. In processes of the prior art use has been made of super-atmospheric pressures to raise the boiling point. Pressures greater than atmospheric may be used without detriment in this invention but such pressures are not preferred because the solvents used permit operation at desired temperatures in vessels open to the atmosphere.

The amount of solvent used may be varied over an extremely wide range for example as much as 50 to 100% in either direction from the preferred amounts disclosed in the examples given.

By this invention sulphur colors are produced in high yield and bright shade. The manufacturing advantages in the reduction of the amount of equipment necessary to produce the same amount of dye as known processes in a given time is very important. This advantage is a direct result of the enormous time savings made possible by this invention.

As many apparently widely different embodiments of this invention may be made without departing from the spirit and scope thereof, it is to be understood that we do not limit ourselves to the specific embodiments thereof except as defined in the appended claims.

We claim:

1. In the production of sulphur colors the step of thionating a member of the group consisting of indophenols, hydroxy-aromatic-amines and hydroxy-amino-phenazines in mono-ethyl-ether of ethylene glycol.

2. In the production of sulphur colors the step of thionating a member of the group consisting of indophenols, hydroxy-aromatic-amines and hydroxy-amino-phenazines in mono-alkyl-ether of ethylene glycol.

3. In the production of sulphur colors the step of thionating a member of the group consisting of indophenols, hydroxy-aromatic-amines and hydroxy-amino-phenazines in mono-ethyl-ether of di-ethylene glycol.

4. In the production of sulphur colors the step of thionating a member of the group consisting of indophenols, hydroxy-aromatic-amines and hydroxy-amino-phenazines in an ether of ethylene glycol.

5. In the production of sulphur colors the step of thionating a member of the group consisting of indophenols, hydroxy-aromatic-amines and hydroxy-amino-phenazines in an ether of di-ethylene glycol.

6. In the production of sulphur colors the step of thionating a member of the group consisting of indophenols, hydroxy-aromatic-amines and hydroxy-amino-phenazines in an ether of a glycol.

7. In the production of sulphur colors the step of thionating an indophenol in mono-ethyl-ether of ethylene glycol.

8. The process of claim 7 in which the indophenol is derived from nitroso-phenol.

9. The process of claim 7 in which the indophenol is derived from nitroso-phenol and diphenyl amine.

10. In the production of sulphur colors the step of thionating a member of the group consisting of indophenols, hydroxy-aromatic-amines, and hydroxy-amino-phenazines in mono-alkyl-ether of diethylene glycol.

11. In the production of sulphur colors the step of thionating by means of an alkali-metal polysulphide a member of the group consisting of indophenols, hydroxy-aromatic-amines and hydroxy-amino-phenazines in an aqueous solution of a mono-alkyl-ether of ethylene glycol.

12. In the production of sulphur colors the step of thionating by means of an alkali-metal polysulphide an indophenol in an aqueous solution of the mono-ethyl-ether of ethylene glycol.

13. In the production of sulphur colors the step of thionating by means of sodium polysulphide para-hydroxy-phenyl-beta-naphthyl-amine in an aqueous solution of the mono-ethyl-ether of ethylene glycol.

HERBERT A. LUBS.
GEORGE C. STROUSE.